United States Patent
Saito

(10) Patent No.: US 10,838,562 B2
(45) Date of Patent: Nov. 17, 2020

(54) ELECTRONIC DEVICE, TABLET TERMINAL, INPUT CONTROL METHOD, AND PROGRAM

(71) Applicant: Panasonic Intellectual Property Management Co., Ltd., Osaka (JP)

(72) Inventor: Shunsuke Saito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/405,646

(22) Filed: May 7, 2019

(65) Prior Publication Data
US 2019/0265816 A1 Aug. 29, 2019

Related U.S. Application Data

(63) Continuation of application No. PCT/JP2017/038114, filed on Oct. 23, 2017.

(30) Foreign Application Priority Data

Dec. 27, 2016 (JP) .................... 2016-253404

(51) Int. Cl.
*G06F 3/044* (2006.01)
*G06F 1/16* (2006.01)
(Continued)

(52) U.S. Cl.
CPC ............ *G06F 3/044* (2013.01); *G06F 1/16* (2013.01); *G06F 1/169* (2013.01); *G06F 1/1616* (2013.01);
(Continued)

(58) Field of Classification Search
CPC .......... G06F 3/044; G06F 1/16; G06F 1/1616; G06F 1/1654; G06F 1/169; G06F 3/03547; G06F 3/041; G06F 1/32
(Continued)

(56) References Cited

U.S. PATENT DOCUMENTS

2013/0285954 A1 10/2013 Takahashi et al.
2013/0307804 A1* 11/2013 Adachi .................. G06F 3/016
345/173

(Continued)

FOREIGN PATENT DOCUMENTS

JP 2004-220253 8/2004
JP 2008-282206 11/2008

(Continued)

OTHER PUBLICATIONS

International Search Report of PCT application No. PCT/JP2017/038114 dated Dec. 12, 2017.

*Primary Examiner* — Amare Mengistu
*Assistant Examiner* — Gloryvid Figueroa-Gibson
(74) *Attorney, Agent, or Firm* — Renner, Otto, Boisselle & Sklar, LLP

(57) ABSTRACT

A touch panel detects contact of one of a finger and a pointing device with the touch panel. A controller performs a process in accordance with a touch operation based on contact with the touch panel. A sensor senses attachment of a second device to and detachment of the second device from a first device. When the touch panel detects that one of a finger and a pointing device is brought into contact with the touch panel while the sensor is sensing one of the attachment of the second device to and the detachment of the second device from the first device, the controller stops acceptance of input into the touch panel. After having stopped the acceptance, the controller resumes the acceptance of the input into the touch panel when the touch panel detects that the one of the finger and the pointing device is separated from the touch panel.

6 Claims, 4 Drawing Sheets

(51) Int. Cl.
*G06F 3/0354* (2013.01)
*G06F 3/041* (2006.01)
*G06F 1/32* (2019.01)

(52) U.S. Cl.
CPC ........ *G06F 1/1654* (2013.01); *G06F 3/03547* (2013.01); *G06F 3/041* (2013.01); *G06F 1/32* (2013.01)

(58) Field of Classification Search
USPC ........................................................ 345/174
See application file for complete search history.

(56) References Cited

U.S. PATENT DOCUMENTS

| | | | | |
|---|---|---|---|---|
| 2014/0152571 A1* | 6/2014 | Ishikawa | ............. | G06F 3/03547 345/168 |
| 2016/0041348 A1* | 2/2016 | Isenhour | ............... | G06F 1/1683 385/57 |

FOREIGN PATENT DOCUMENTS

| | | |
|---|---|---|
| JP | 2013-228836 | 11/2013 |
| JP | 2014-109893 | 6/2014 |
| JP | 2016-081130 | 5/2016 |

* cited by examiner

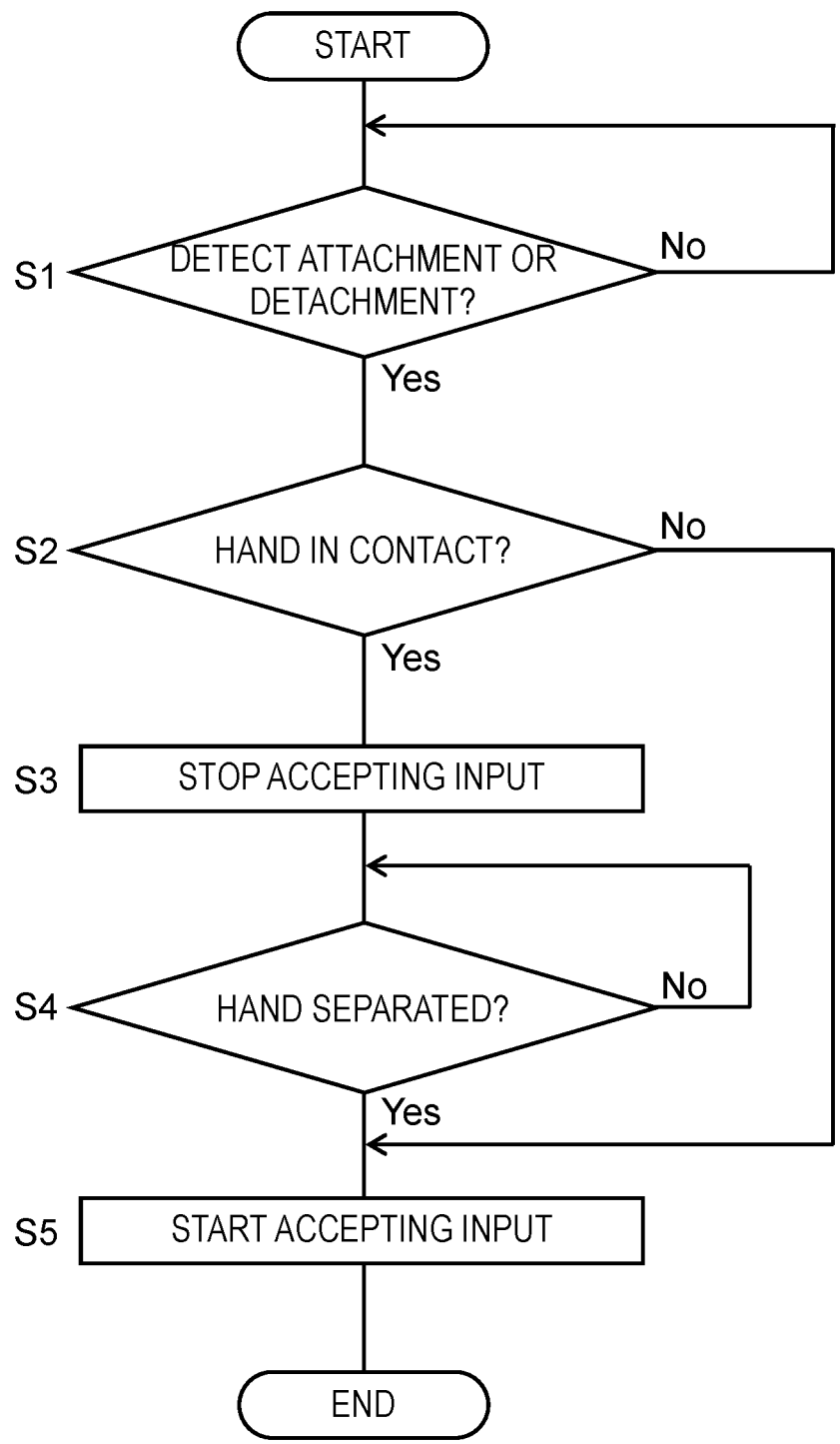

ELECTRONIC DEVICE, TABLET TERMINAL, INPUT CONTROL METHOD, AND PROGRAM

TECHNICAL FIELD

The present disclosure relates to an electronic device with a touch panel, a tablet terminal, an input control method, and a program.

BACKGROUND ART

PTL 1 discloses an electronic device with a touch panel and an input device with a keyboard and a touch pad. This electronic device is detachably connected to the input device. When connected to the input device, the electronic device disables a function of detecting a point on the touch panel. This operation successfully decreases power consumption.

CITATION LIST

Patent Literature

PTL 1: Unexamined Japanese Patent Publication No. 2014-109893

SUMMARY OF THE INVENTION

The present disclosure relates to an electronic device, a tablet terminal, an input control method, and a program, all of which prevent a malfunction.

An electronic device of the present disclosure includes: a first device; and a second device attachable to and detachable from the first device. Second device includes a touch panel, a controller, and a sensor. The touch panel detects contact of one of a finger and a pointing device with the touch panel. The controller performs a process in accordance with a touch operation based on the contact with the touch panel. The sensor senses attachment of the second device to the first device and detachment of the second device from the first device. When the touch panel detects that one of the finger and the pointing device is brought into contact with the touch panel while the sensor is sensing one of the attachment of the second device to the first device and the detachment of the second device from first device, the controller stops acceptance of input into the touch panel. After having stopped the acceptance, the controller resumes the acceptance of the input into the touch panel when the touch panel detects that the one of the finger and the pointing device is separated from the touch panel.

A tablet terminal of the present disclosure which is attachable to and detachable from an external device includes a touch panel, a controller, and a sensor. The touch panel detects contact of one of a finger and a pointing device with the touch panel. The controller performs a process in accordance with a touch operation based on the contact with the touch panel. The sensor senses attachment of the tablet terminal to the external device and detachment of the tablet terminal from the external device. When the touch panel detects that one of the finger and the pointing device is brought into contact with the touch panel while the sensor is sensing one of the attachment of the tablet terminal to the external device and the detachment of the tablet terminal from the external device, the controller stops acceptance of input into the touch panel. After having stopped the acceptance, the controller resumes the acceptance of the input into the touch panel when the touch panel detects that the one of the finger and the pointing device is separated from the touch panel.

An input control method of the present disclosure is an input control method using an electronic device that includes: a first device; and a second device attachable to and detachable from the first device. The second device includes a touch panel, a controller, and a sensor. The touch panel detects contact of one of a finger and a pointing device with the touch panel. The controller performs a process in accordance with a touch operation based on the contact with the touch panel. The sensor senses attachment of the second device to the first device and detachment of the second device from the first device. The input control method includes: when the touch panel detects that one of the finger and the pointing device is brought into contact with the touch panel while the sensor is sensing one of the attachment of the second device to the first device and the detachment of the second device from the first device, stopping acceptance of input into the touch panel; and after having stopped the acceptance, resuming the acceptance of the input into the touch panel when the touch panel detects that the one of the finger and the pointing device is separated from the touch panel.

A program of the present disclosure causes a computer to perform the above input control method.

The electronic device, the tablet terminal, the input control method, and the program according to the present disclosure can prevent a malfunction.

BRIEF DESCRIPTION OF DRAWINGS

FIG. 4 is a flowchart used to explain control of touch input in the first exemplary embodiment.

DESCRIPTION OF EMBODIMENTS (Problem)

There is an electronic device that includes: a base device (first device); and a tablet terminal (second device) attachable to and detachable from the base device. A user of this electronic device holds the tablet terminal in his/her hand and then detaches the tablet terminal from the base device. Likewise, when attaching the tablet terminal to the base device, the user holds the tablet terminal in the hand. In this case, if the user's hand is brought into contact with the touch panel of the tablet terminal, the tablet terminal may operate in response to the contact of the hand. In short, when the user attaches the tablet terminal to the base device or detaches the tablet terminal from the base device, an unexpected malfunction may be generated. The present disclosure provides an electronic device that prevents a malfunction from being generated when a tablet terminal is attached or detached. Details of the electronic device of the present disclosure will be described below.

First Exemplary Embodiment

1. Configuration
1. 1 Overall Configuration

Figure 1A:
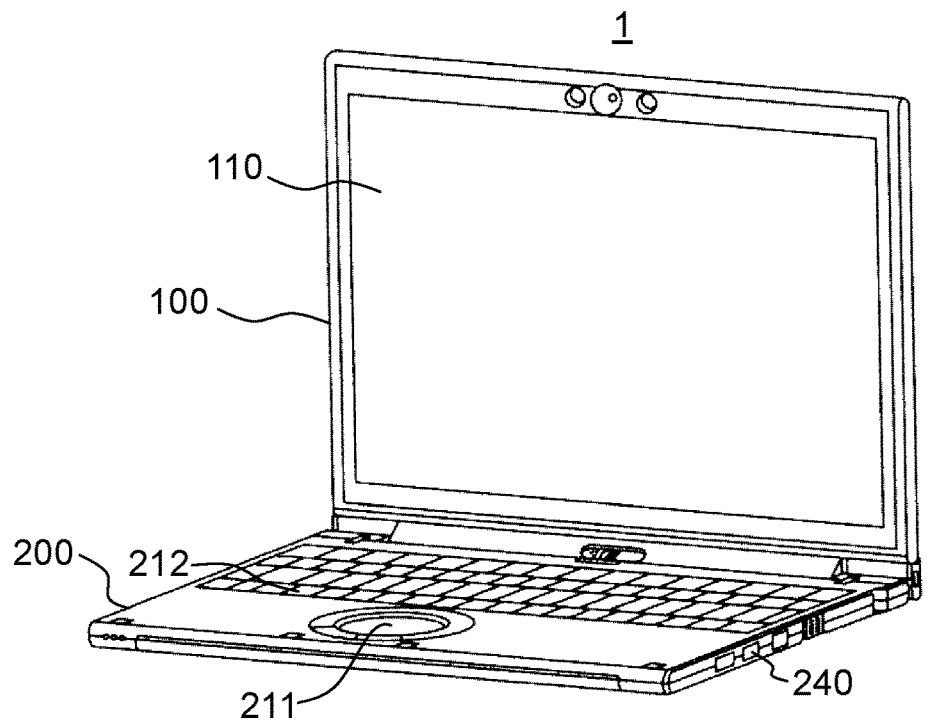
FIG. 1A is a perspective view of an information processing device according to a first exemplary embodiment of the present disclosure.
Figure 1B:
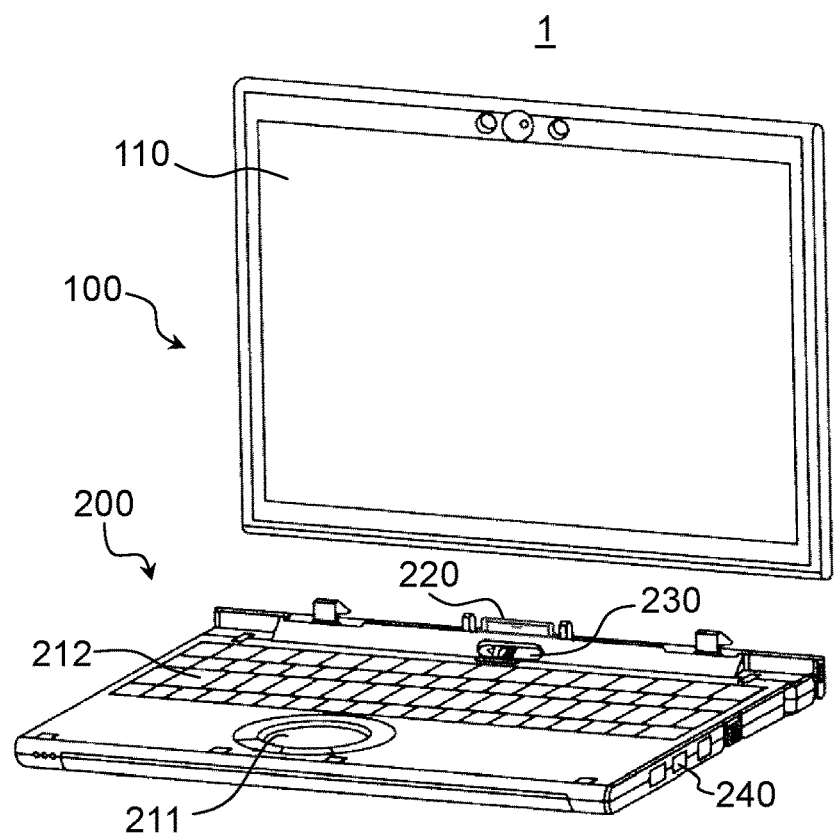
FIG. 1B is a perspective view of the information processing device according to the first exemplary embodiment of the present disclosure.

FIGS. 1A and 1B each illustrate an appearance of an information processing device, which is an example of an electronic device according to a first exemplary embodiment of the present disclosure. Information processing device 1 in this exemplary embodiment includes: tablet terminal 100; and base device 200 attachable to tablet terminal 100. FIG. 1A illustrates tablet terminal 100 in a state of being attached to base device 200. FIG. 1B illustrates tablet terminal 100 in a state of being detached from base device 200. As illustrated in FIGS. 1A and 1B, tablet terminal 100 is attachable to and detachable from base device 200. When tablet terminal 100 is attached to base device 200, information processing device 1 can be used as a notebook computer (see FIG. 1A). Tablet terminal 100 can also be used alone. Further, tablet terminal 100 can be used as a tablet computer (see FIG. 1B). In short, information processing device 1 is a so-called detachable type computer.

1.2 Configuration of Tablet Terminal

Figure 2:
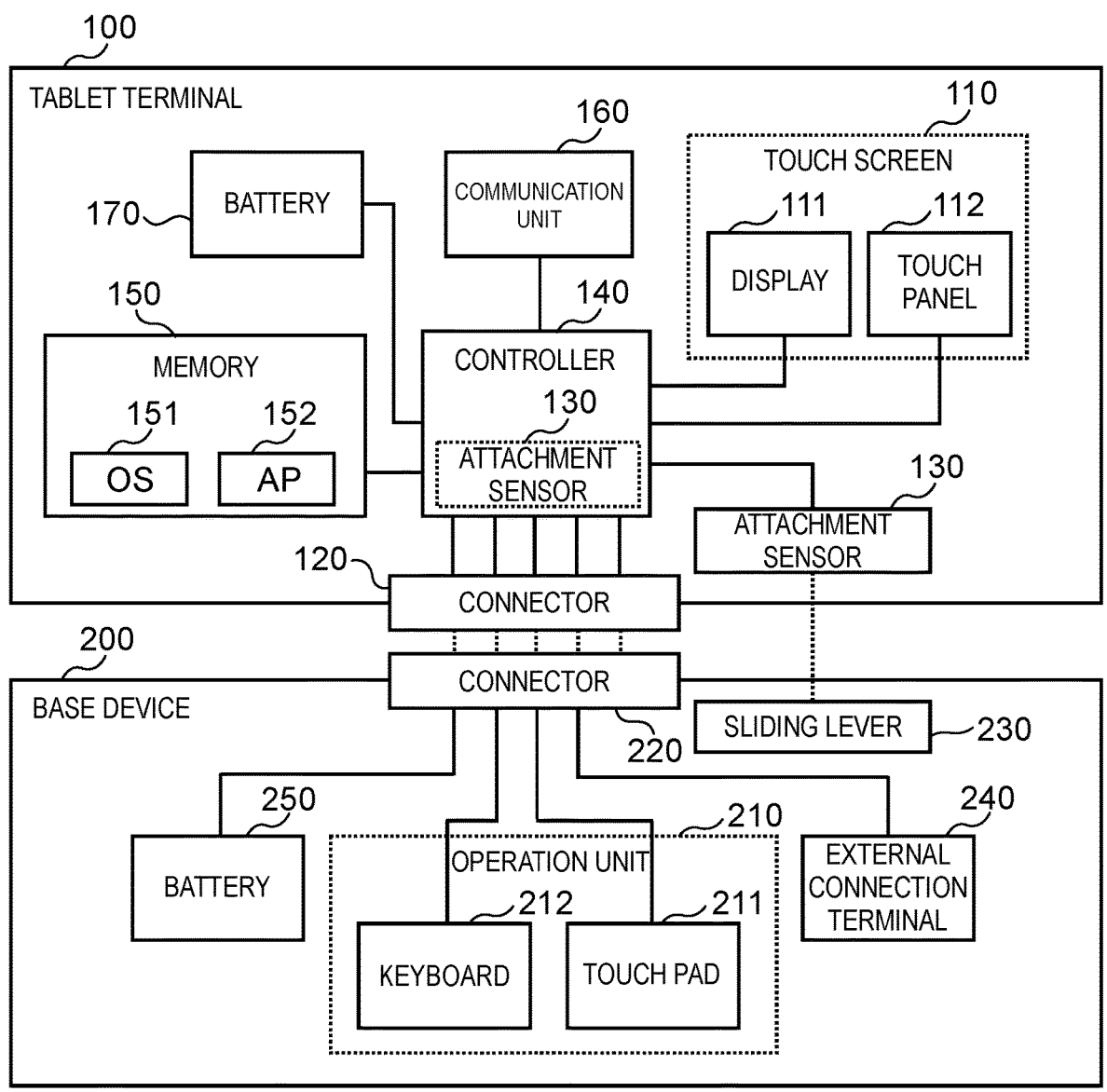
FIG. 2 is a block diagram of a configuration of the information processing device according to the first exemplary embodiment.

FIG. 2 illustrates a configuration of information processing device 1. Tablet terminal 100 includes touch screen 110, connector 120, attachment sensor 130, controller 140, memory 150, communication unit 160, and battery 170.

As illustrated in FIGS. 1A and 1B, touch screen 110 is provided on one principal surface of the housing. Touch screen 110 includes display 111 and touch panel 112. Display 111 may be a display unit formed of a liquid crystal display or an organic electroluminescence (EL) display, for example. Touch panel 112 is provided on a surface of display 111. Touch panel 112 detects contact of one of a user's finger and a pointing device (e.g., pen) with touch panel 112. Touch panel 112 may include an electrode film, for example. Controller 140 can pinpoint a location at which the one of the finger and the pointing device makes contact with touch panel 112, for example, by measuring a variation in a voltage or capacitance in response to the contact.

Connector 120 includes connection terminals via which tablet terminal 100 is electrically connected to base device 200. Attachment sensor 130 detects whether tablet terminal 100 is attached to base device 200.

Controller 140 controls entire information processing device 1. Controller 140 may be implemented by a semiconductor element, for example. Controller 140 may be formed of a microcomputer, a central processing unit (CPU), a micro processing unit (MPU), a digital signal processor (DSP), a field programmable gate array (FPGA), or an application specific integrated circuit (ASIC), for example. A function of controller 140 may be implemented in hardware alone or a combination of hardware and software. Memory 150 may be implemented by, for example, one or a combination of read only memory (ROM), a solid state drive (SSD), random access memory (RAM), dynamic random access memory (DRAM), ferroelectric memory, flash memory, and a magnetic disk.

Stored in memory 150 is operating system (OS) 151, various application programs (APs) 152, and various data, for example. Controller 140 implements various functions by reading OS 151, APs 152, and various data to perform arithmetic processing. APs 152 can use an application programming interface (API) of OS 151. For example, while controller 140 is activating APs 152, APs 152 can use the API of OS 151 to acquire coordinates of a location at which one of a user's finger and a pointing device makes contact with touch panel 112.

Communication unit 160 has an interface circuit that communicates with an external device in conformity with a predetermined communication specification (e.g., local area network (LAN) or Wireless Fidelity (Wi-Fi)). Battery 170 may be a rechargeable, secondary battery (e.g., lithium-ion battery), for example.

1. 3 Configuration of Base Device

Base device 200 includes operation unit 210, connector 220, sliding lever 230, external connection terminal 240, and battery 250.

Operation unit 210 includes touch pad 211 and keyboard 212, both of which allow the user to perform an input operation. Connector 220 includes connection terminals via which tablet terminal 100 is electrically connected to base device 200.

Sliding lever 230 is a member that enables tablet terminal 100 to be detached from base device 200. Base device 200 has a lock mechanism (not illustrated) that locks holding of tablet terminal 100 when tablet terminal 100 is attached to base device 200. In a state where tablet terminal 100 is attached to base device 200 and locked, when the user slides sliding lever 230 in a longitudinal direction of base device 200, the lock is released. In this way, the user can detach tablet terminal 100 from base device 200.

External connection terminal 240 is an input and output port via which base device 200 is to be connected to a peripheral device. External connection terminal 240 may be configured with a communication interface, such as a universal serial bus (USB) or a high-definition multimedia interface (HDMI (registered trademark)). Battery 250 may be a rechargeable, secondary battery (e.g., lithium-ion battery), for example.

When tablet terminal 100 is attached to base device 200, connector 120 of tablet terminal 100 is electrically connected to connector 220 of base device 200. In this case, a circuit inside tablet terminal 100 can transmit a signal or electric power to a circuit inside base device 200 and receive a signal or electric power from the circuit inside base device 200. For example, various pieces of information that are input via operation unit 210 and external connection terminal 240 in base device 200 are transmitted to controller 140.

1. 4 Configuration of Attachment Sensor

As one example of attachment sensor 130 in this exemplary embodiment, controller 140 also functions as attachment sensor 130. For example, one of the terminal pins of connector 120 in tablet terminal 100 may be a terminal pin used to sense the attachment and detachment. When tablet terminal 100 is attached to base device 200, for example, a voltage at the terminal pin used to sense the attachment and detachment may be set to a "High" level. When tablet terminal 100 is detached from base device 200, the voltage at this terminal pin may be set to a "Low" level. Controller 140 (attachment sensor 130) senses the voltage at the terminal pin used to sense the attachment and detachment, thereby sensing the attachment of tablet terminal 100 to base device 200 and the detachment of tablet terminal 100 from base device 200.

Figure 3A:
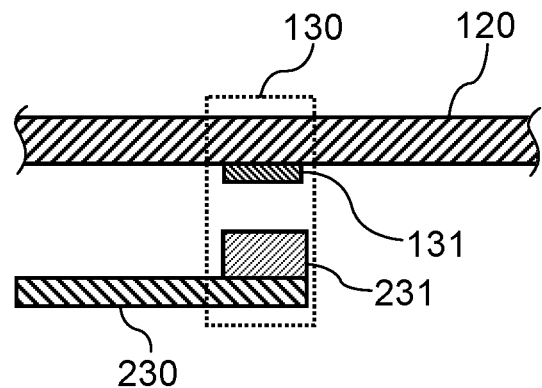
FIG. 3A is a view used to explain an attachment sensing operation in the first exemplary embodiment.
Figure 3B:
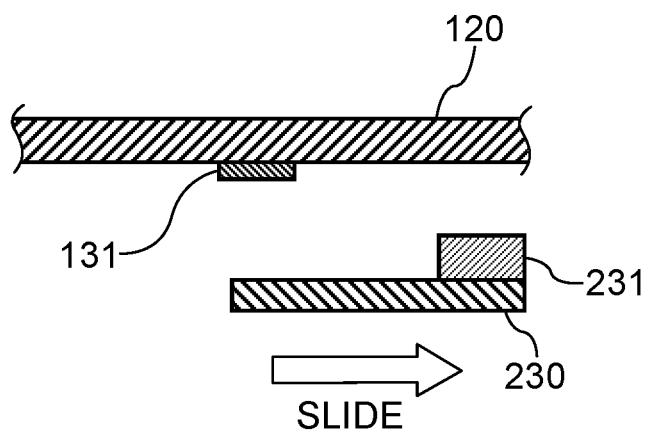
FIG. 3B is a view used to explain a detachment sensing operation in the first exemplary embodiment.

Attachment sensor 130 may have any configuration that can sense the attachment of tablet terminal 100 to base device 200 and the detachment of tablet terminal 100 from base device 200. As another example of attachment sensor 130 in this exemplary embodiment, for example, attachment sensor 130 may be provided independently of controller 140. FIGS. 3A and 3B are views each used to explain an operation of attachment sensor 130 provided independently of controller 140 in which the attachment of tablet terminal 100 to base device 200 and the detachment of tablet terminal 100 from base device 200 is sensed. Attachment sensor 130 includes: magnet 231; and magnetic sensor 131 that detects a magnetic field from magnet 231. Magnet 231 is attached to sliding lever 230.

As illustrated in FIG. 3A, in a state where sliding lever 230 is not operated, magnetic sensor 131 is attached to connector 120 so as to be positioned near magnet 231. In other words, in a state where tablet terminal 100 is attached to base device 200 and locked, magnet 231 is positioned near magnetic sensor 131, as illustrated in FIG. 3A. In this case, if the user operates sliding lever 230 in order to detach tablet terminal 100, magnet 231 moves away from magnetic sensor 131 in accordance with the movement of sliding lever 230, as illustrated in FIG. 3B. As a result, the intensity of the magnetic field received by magnetic sensor 131 becomes lower than the intensity of the magnetic field received before sliding lever 230 is operated. Then, when tablet terminal 100 is detached from base device 200, magnetic sensor 131 receives a very weak or no magnetic field from magnet 231.

Controller 140 in tablet terminal 100 receives a detection signal from magnetic sensor 131 and then determines a variation in intensity of the magnetic field. Controller 140 thereby can detect an attachment state of tablet terminal 100 on base device 200. For example, when the intensity of the magnetic field is higher than a first predetermined value (magnetic intensity>first predetermined value), controller 140 determines that tablet terminal 100 is attached to base device 200 and sliding lever 230 is not operated. When the intensity of the magnetic field falls within a range from the first predetermined value to a second predetermined value, the second predetermined value being lower than the first predetermined value (second predetermined value≤magnetic intensity≤first predetermined value), controller 140 determines that sliding lever 230 is being operated in order to detach tablet terminal 100. When the intensity of the magnetic field is lower than the second predetermined value (magnetic intensity<second predetermined value), controller 140 determines that tablet terminal 100 is detached from base device 200. As a result, if the intensity of the magnetic field sensed by magnetic sensor 131 varies from a value equal to or more than the first predetermined value to a value less than the first predetermined value, for example, controller 140 determines that tablet terminal 100 is being detached from base device 200. If the intensity of the magnetic field sensed by magnetic sensor 131 varies from a value less than the second predetermined value to a value equal to or more than the second predetermined value, controller 140 determines that tablet terminal 100 is being attached to base device 200.

As described above, attachment sensor 130 senses attachment of tablet terminal 100 to base device 200 and detachment of tablet terminal 100 from base device 200, based on the operation of sliding lever 230.

A location of magnetic sensor 131 relative to magnet 231 may be determined, for example, such that magnetic sensor 131 can detect an operation of detaching tablet terminal 100 before tablet terminal 100 is actually detached from base device 200.

2. Operation

FIG. 4 illustrates input control of touch panel 112 performed by controller 140. Controller 140 determines attachment or detachment of tablet terminal 100, based on an output from attachment sensor 130 (S1). When sensing the attachment or detachment (Yes in S1), controller 140 further determines whether a hand is in contact with touch panel 112, based on the output from touch panel 112 (S2).

When detecting the contact of the hand with touch panel 112 (Yes in S2), controller 140 stops acceptance of input into touch panel 112 (S3). In other words, controller 140 disables the input into touch panel 112 and does not perform an operation based on the contact with touch panel 112. This control operation thus prevents information processing device 1 from malfunctioning based on the contact even if the user makes contact with touch panel 112 in order to attach or detach tablet terminal 100.

Controller 140 then determines whether the hand is separated from touch panel 112, based on the output from touch panel 112 (S4). When the hand is separated from touch panel 112, controller 140 starts (resumes) the acceptance of the input (S5). In other words, controller 140 enables the input into touch panel 112 from the present. It is believed that, when the attachment or detachment of tablet terminal 100 is completed, the user's hand that has been in contact with touch panel 112 upon the attachment or detachment is temporarily separated from touch panel 112. Controller 140 therefore resumes the acceptance of the input in response to the separation of the hand from touch panel 112, thereby allowing the user to operate touch panel 112 from the present.

When controller 140 detects that the hand is not in contact with touch panel 112 while sensing the attachment or detachment (No at S2), controller 140 starts the acceptance of the input promptly (S5). In other words, controller 140 enables the input into touch panel 112 from the present.

The case where the hand makes contact with touch panel 112 has been described as an example; however, controller 140 performs the input operation illustrated in FIG. 4 also in a case where a pointing device makes contact with touch panel 112.

3. Effect and Others

Information processing device 1 (an example of an electronic device) in this exemplary embodiment includes: base device 200 (an example of a first device); and tablet terminal 100 (an example of a second device) attachable to and detachable from base device 200. Tablet terminal 100 includes touch panel 112, controller 140, and attachment sensor 130 (an example of a sensor). Touch panel 112 detects contact of one of a finger and a pointing device with touch panel 112. Controller 140 performs a process in accordance with a touch operation based on the contact with touch panel 112. Attachment sensor 130 senses one of attachment of tablet terminal 100 to base device 200 and detachment of tablet terminal 100 from base device 200. When touch panel 112 detects that one of a finger and a pointing device is brought into contact with touch panel 112 while attachment sensor 130 is sensing one of attachment of tablet terminal 100 to base device 200 and detachment of tablet terminal 100 from base device 200, controller 140 stops acceptance of input into touch panel 112. After having stopped the acceptance, controller 140 resumes the acceptance of the input into touch panel 112 when touch panel 112 detects that the one of the finger and the pointing device is separated from touch panel 112. As a result, even if a user's hand or a pointing device is brought into contact with touch panel 112 while a user is attaching tablet terminal 100 to or detaching tablet terminal 100 from base device 200, controller 140 can stop the acceptance of the input into touch panel 112. This input control method can prevent tablet terminal 100 from malfunctioning upon the attachment and detachment of tablet terminal 100.

An input control method in this exemplary embodiment is an input control method using information processing device 1 (an example of an electronic device) that includes: base device 200 (an example of a first device); and tablet terminal 100 (an example of a second device) attachable to and detachable from base device 200. Tablet terminal 100 includes touch panel 112, controller 140, and attachment sensor 130. Touch panel 112 detects contact of one of a finger and a pointing device with touch panel 112. Controller 140 performs a process in accordance with a touch operation based on the contact with touch panel 112. Attachment sensor 130 senses one of attachment of tablet terminal 100 to base device 200 and detachment of tablet terminal 100 from base device 200. This input control method includes: stopping acceptance of input into touch panel 112 when touch panel 112 detects that one of a finger and a pointing device is brought into contact with touch panel 112 while attachment sensor 130 is sensing one of attachment of tablet terminal 100 to base device 200 and detachment of tablet terminal 100 from base device 200; and, after the acceptance of the input is stopped, resuming the acceptance of the input into touch panel 112 when touch panel 112 detects that the one of the finger and the pointing device is separated from touch panel 112. As a result, even if a user's hand or a pointing device is brought into contact with touch panel 112 while a user is attaching tablet terminal 100 to or detaching tablet terminal 100 from base device 200, controller 140 can stop the acceptance of the input into touch panel 112. This input control method can prevent tablet terminal 100 from malfunctioning upon the attachment and detachment of tablet terminal 100.

The above input control method may be performed by a computer executing a program. This program may be stored in a storage medium according to the present disclosure.

Other Exemplary Embodiments

The first exemplary embodiment has been described above as an example of the technique disclosed in the present application. However, the technique of the present disclosure is not limited to the first exemplary embodiment, and also applicable to other exemplary embodiments that undergo some modifications, replacements, additions, and omissions, for example, as appropriate. Novel exemplary embodiments may also be contemplated from a combination of some components of the foregoing first exemplary embodiment. Some other exemplary embodiments will be described below as examples.

In the foregoing first exemplary embodiment, attachment sensor 130 detects that a hand is separated from touch panel 112 at step S4 in FIG. 4, and then controller 140 starts the acceptance of the input into touch panel 112, independently of an attachment state of tablet terminal 100 on base device 200 at step S5. However, controller 140 may determine whether to start the acceptance of the input into touch panel 112 after the hand has been separated from touch panel 112, based on the attachment state of tablet terminal 100 on base device 200. As an alternative example, when tablet terminal 100 is attached to base device 200, controller 140 may continue to stop the acceptance of the input without performing step S5. In a state where tablet terminal 100 is attached to base device 200, information processing device 1 accepts the input via operation unit 210. Controller 140 thus can prevent tablet terminal 100 from malfunctioning in response to contact with touch panel 112 by stopping the acceptance of the input into touch panel 112.

In the foregoing first exemplary embodiment, a so-called detachable type computer has been described as an example of the electronic device. An idea of the present disclosure is, however, also applicable to other types of electronic devices with touch panel 112. As an alternative example, the present disclosure is applicable to electronic devices with touch panels, such as tablet terminals attachable to external devices with keyboards.

As described above, the exemplary embodiments have been described as examples of the technique in the present disclosure. For that purpose, the accompanying drawings and the detailed description have been provided. The components illustrated in the accompanying drawings and described in the detailed description can include components essential for solving the problems, as well as components that are not essential for solving the problems but required to describe the above techniques as an example. Therefore, these non-essential components illustrated in the accompanying drawings and described in the detailed description should not be perceived as being essential without consideration.

The above exemplary embodiments are provided for exemplification of the techniques in the present disclosure, and thus can undergo various modifications, replacements, additions, and removals, for example, within the scope of the claims or equivalents.

INDUSTRIAL APPLICABILITY

The present disclosure is applicable to electronic devices with touch panels. More specifically, the present disclosure is applicable to detachable type computers, tablet terminals attachable to and detachable from external devices, and other similar devices.

REFERENCE MARKS IN THE DRAWINGS

1: information processing device (electronic device)
100: tablet terminal (second device)
110: touch screen
111 display (display unit)
112: touch panel
130: attachment sensor (sensor)
140: controller
150: memory
151: operating system
152: application programs
160: communication unit
170: battery
200: base device (first device)
210: operation unit
211: touch pad
212: keyboard
230: sliding lever
240: external connection terminal
250: battery

The invention claimed is:
1. An electronic device comprising:
a first device; and
a second device attachable to and detachable from the first device, the second device including
a touch panel that detects contact of one of a finger and a pointing device with the touch panel,
a controller that performs a process in accordance with a touch operation based on the contact with the touch panel, and a sensor that senses attachment of the second device to the first device and detachment of the second device from the first device, wherein the controller is configured to:

determine whether the touch panel detects that one of the finger and the pointing device is brought into contact with the touch panel while the sensor is sensing one of the attachment of the second device to the first device and the detachment of the second device from first device, stop acceptance of input into the touch panel in response to the determination that the touch panel detects that one of the finger and the pointing device is brought into contact with the touch panel while the sensor is sensing one of the attachment of the second device to the first device and the detachment of the second device from the first device, and resume, after having stopped the acceptance, the acceptance of the input into the touch panel when the touch panel detects that the one of the finger and the pointing device is separated from the touch panel.

2. The electronic device according to claim 1, wherein the second device has a display unit provided with the touch panel, and the first device has an operation unit that enables input into the second device.

3. The electronic device according to claim 1, wherein the first device has a sliding lever, and the sensor senses the attachment and the detachment of the second device based on an operation of the sliding lever.

4. A tablet terminal attachable to and detachable from an external device, the tablet terminal comprising:

a touch panel that detects contact of one of a finger and a pointing device with the touch panel;

a controller that performs a process in accordance with a touch operation based on the contact with the touch panel; and a sensor that senses attachment of the tablet terminal to the external device and detachment of the tablet terminal from the external device, wherein the controller is configured to:

determine whether the touch panel detects that one of the finger and the pointing device is brought into contact with the touch panel while the sensor is sensing one of the attachment of the tablet terminal to the external device and the detachment of the tablet terminal from the external device, stop acceptance of input into the touch panel in response to the determination that the touch panel detects that one of the finger and the pointing device is brought into contact with the touch panel while the sensor is sensing one of the attachment of the second device to the first device and the detachment of the second device from the first device, and resume, after having stopped the acceptance, the acceptance of the input into the touch panel when the touch panel detects that the one of the finger and the pointing device is separated from the touch panel.

5. An input control method using an electronic device including a first device and a second device, the second device being attachable to and detachable from the first device, the second device including a touch panel that detects contact of one of a finger and a pointing device with the touch panel, a controller that performs a process in accordance with a touch operation based on the contact with the touch panel, and a sensor that senses attachment of the second device to the first device and detachment of the second device from the first device, the input control method comprising:

determining whether the touch panel detects that one of the finger and the pointing device is brought into contact with the touch panel while the sensor is sensing one of the attachment of the second device to the first device and the detachment of the second device from the first device, stopping acceptance of input into the touch panel in response to determining that the touch panel detects that one of the finger and the pointing device is brought into contact with the touch panel while the sensor is sensing one of the attachment of the second device to the first device and the detachment of the second device from the first device; and resuming, after having stopped the acceptance, the acceptance of the input into the touch panel when the touch panel detects that the one of the finger and the pointing device is separated from the touch panel.

6. A non-transitory computer readable medium having stored thereon a program which, when executed by a computer, causes the computer to perform the input control method according to claim 5.

\* \* \* \* \*